United States Patent
Keiser

(12) 
(10) Patent No.: US 8,582,738 B1
(45) Date of Patent: Nov. 12, 2013

(54) PERSON-TO-PERSON CALLING ACCOUNTS

(75) Inventor: Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 339 days.

(21) Appl. No.: 13/009,821

(22) Filed: Jan. 19, 2011

(51) Int. Cl.
*H04M 15/00* (2006.01)
*H04M 17/00* (2006.01)

(52) U.S. Cl.
USPC ............................... 379/114.14; 379/144.02

(58) Field of Classification Search
USPC .............. 379/114.14, 114.23–114.24, 144.02
See application file for complete search history.

(56) References Cited

U.S. PATENT DOCUMENTS

| | | | | |
|---|---|---|---|---|
| 8,064,580 B1* | 11/2011 | Apple et al. | ............. | 379/114.14 |
| 2007/0041535 A1* | 2/2007 | Forrest | .................... | 379/114.21 |
| 2008/0279347 A1* | 11/2008 | Brown et al. | .............. | 379/88.02 |
| 2009/0046841 A1* | 2/2009 | Hodge | .......................... | 379/189 |

* cited by examiner

*Primary Examiner* — Quoc D Tran
(74) *Attorney, Agent, or Firm* — Fogarty, L.L.C.

(57) ABSTRACT

Embodiments of the invention provide a system and method for providing call connections between a calling party and a verified called party. A person-to-person account is identified for the called party. An answering party is prompted to provide identification information. The identification information is compared to data in the person-to-person account. The call connection is not completed unless the called party's identity is verified.

18 Claims, 2 Drawing Sheets

PERSON-TO-PERSON CALLING ACCOUNTS

TECHNICAL FIELD

Embodiments of the invention are directed, in general, to providing calling services, and, more specifically, to methods for controlling the recipient of calls from a controlled environment facility.

BACKGROUND

The vast majority of telephone calls are made without operator assistance and without identifying or verifying the parties to the telephone call. Typical telephone calls involve the calling party simply dialing a destination telephone number and talking to whomever answers the called telephone. In some instances, the calling party may have to provide identification information to verify that they are authorized to use the telephone system. This verification of the calling party is usually done for billing purposes, such as to provide a prepaid or credit card account number and personal identification number (PIN), or to provide some other telephone system access number.

The called party is rarely required to provide information to complete a telephone call. For a collect telephone call in which the calling party wants to place a call at the called party's expense, the person answering the call is asked whether they will accept the charges. However, the person answering the called telephone is not asked for identification. In the past, collect calls were only possible as an operator-assisted call, but with the introduction of computer-based telephone dialing equipment, it is now possible to place a collect call without using an operator. Currently, when a collect call is made, the phone system must determine if the called number can be billed for the call. If the number can be billed for the call, the collect call will be connected as long as someone at the called number accepts the call charges. However, the person accepting the call may not be the one responsible for paying for the call. Since there is no way for the computer-based telephone dialing equipment to determine who is accepting the charges at the called number, the collect call may be permitted even though the account owner of the called number does not wish to accept the charges.

In traditional person-to-person calls, an operator's assistance was required to place the call to the destination telephone number and to ask if a particular called party was available. However, there is no way for the operator to verify that the answering person is the designated called party.

SUMMARY

Embodiments of the invention are directed to providing a more accurate person-to-person calling service. Instead of just allowing anyone at the called number to accept a call, the call processing system requires the person answering the call at the called number to verify their identity. When the caller initiates a call, a call processing system collects identifying information, such as the caller's identification and the called party's telephone number, and the method in which the caller would like to pay for the call. If the collected information is not associated with a person-to-person calling account, then the call is connected in a normal manner between the caller and called party.

If the collected information is associated with a person-to-person account, the called party must verify their identity before the call can be completed. The identity verification for the called party may be through a PIN, pass phrase, voice-biometric, or other similar security measure. Once the system receives the identity verification from the called party, the system verifies with the person-to-person account information stored in the system. If the identity verification is incorrect, then the call is terminated and no call connection is made between the calling party and the destination telephone number.

BRIEF DESCRIPTION OF THE DRAWINGS

Figure 1:
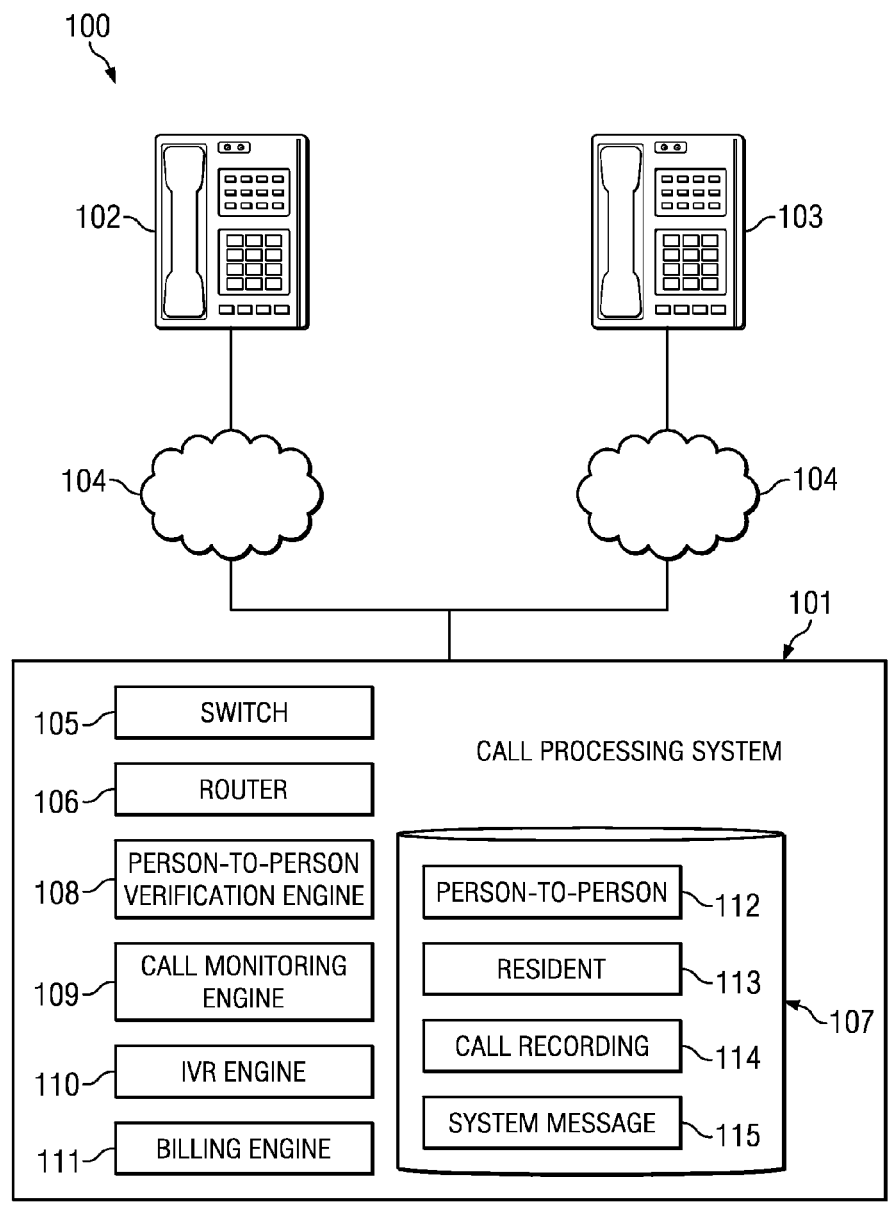
Figure 2:
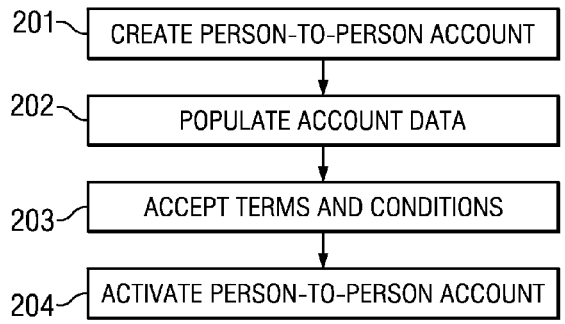
Figure 3:
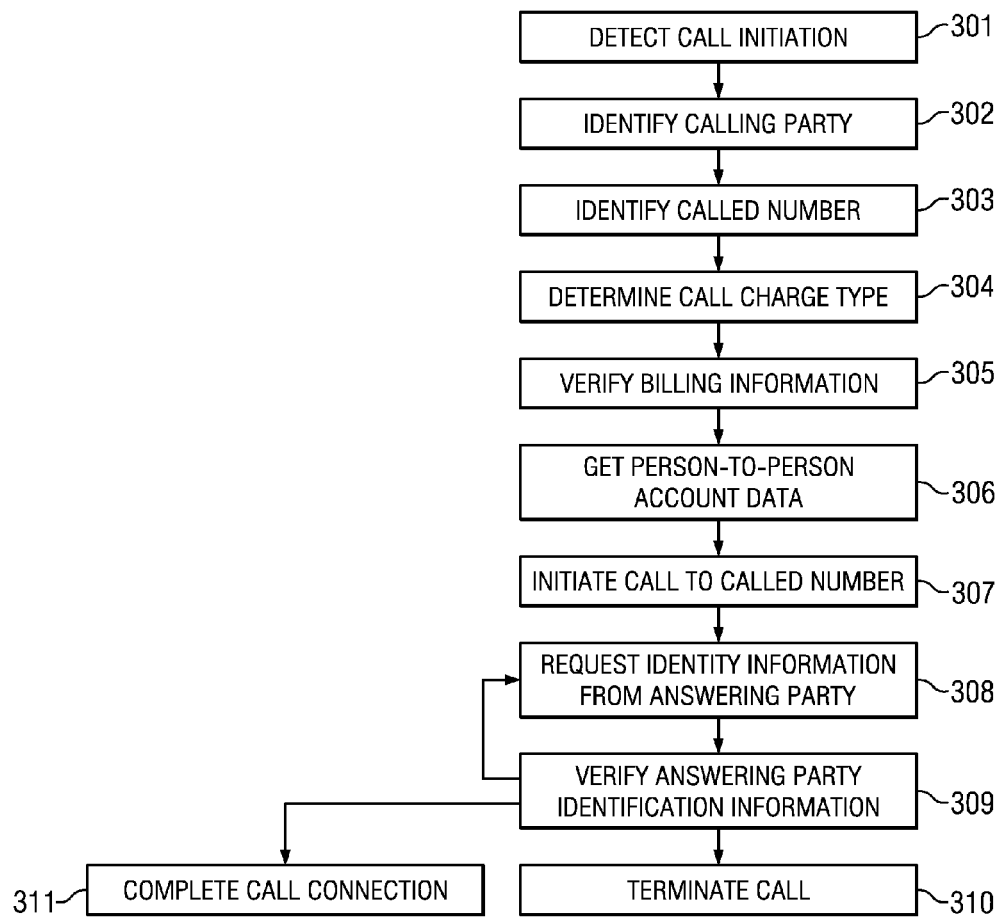

Having thus described the invention in general terms, reference will now be made to the accompanying drawings, which are not necessarily drawn to scale, and wherein:

FIG. 1 is a block diagram of an exemplary embodiment of a telecommunications system;

FIG. 2 is a flowchart illustrating the set up of a person-to-person calling account according to one embodiment; and FIG. 3 is a flowchart illustrating use of a person to person calling system according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of an exemplary embodiment of a telecommunications system 100 for providing communication services. Telecommunications system 100 may be used, for example, to provide calling services to residents or residents in a controlled environment facility. Telecommunications system 100 comprises a call processing system 101, which may include, for example, switching or routing equipment to support circuit-switched or packet-based communication connections. Call processing system 101 supports analog and/or digital communications, such as Plain Old Telephone Service (POTS), Voice over IP (VoIP), video communication, email, and any other communication format. One or more resident telephones 102 are supported by call processing system 101. In one embodiment, resident telephones 102 are located in a controlled environment facility, such as a jail, prison, holding cell, or hospital. Call processing system 101 provides communication services between resident telephone 102 and one or more called telephones 103, which may be, for example, telephones located at a residence, business, or government or public facility located separately from the controlled environment facility and/or resident telephone 102.

Call processing system 101 and resident telephone 102 may be provided by the same service provider. Alternatively, call processing system 101 may provide communication services to one or more subscribers' resident telephones 102. Call processing system 101 may be co-located with resident telephones 102 or located remotely from resident telephones 102. A service provider's resident telephones 102 may be deployed at one or more locations or facilities. Call processing system 101 may communicate with resident telephones 102 and/or called telephones 103 via any public or private communications network 104, such as a public switched telephone network (PSTN), a packet-based communication network, such as the Internet, a local area network (LAN), a metropolitan area network (MAN), a wide area network (WAN), or any other communications network, including a wireless network, a cable transmission system, a satellite transmission system, and/or the like.

The resident telephone 102 and the called telephone 103 may be embodied as any communication device and are not limited to traditional telephones. For example, although the word "telephone" is used herein, telephones 102 and 103 will be understood to include any communication device, including, without limitation, a Touch-Tone or rotary telephone, cellular or mobile telephone, personal digital assistant (PDA), pager, personal or laptop computer running, for example, an email or VoIP software application, and the like.

Call processing system 101 comprises a processor-driven device or devices, such as a switch 105 and/or router 106, configured to receive and process telephone calls. To process the telephone calls and provide the services described herein, call processing system 101 stores data and software programs or modules in a memory 107 that may be logically or physically divided. The data and program modules include, for example, person-to-person verification engine 108, call monitoring engine 109, interactive communication engine 110, and billing engine 111. Additionally, call processing system 101 may also comprise or be in communication with one or more databases, memories, or data storage devices. For example, call processing system 101 communicates with or comprises person-to-person database 112, resident database 113, recorded call database 114, and system messages database 115.

In one embodiment, resident telephone 102 is located in a controlled environment facility, such as a prison, jail, or psychiatric hospital. Prisoners, inmates, patients, or other residents at the controlled environment facility may use resident telephone 102 to communicate with family, friends, attorneys, bail bondsmen, or other parties. The controlled environment facility may charge for the use of resident telephone 102 by allowing a resident to pay for the call through a commissary or trust account. Alternatively, if the resident cannot pay for the call, the controlled environment facility may allow the resident to make collect or prepaid calls that are billed to some other entity.

In addition to determining how to bill the call, call processing system 101 may determine whether the called party can accept the call. For example, the called party may be required to provide a PIN, voice-biometric identifier, code word, or similar security measure, to accept the collect call. After the called party correctly provides the appropriate security answer, the desired call connection is completed and the resident and called party may communicate. In one embodiment, a person-to-person database 112 stores the name, number, billing information, and security measure associated with each person-to-person account.

Call processing system 101 identifies the resident and called party. The identification may be based, for example, on a resident's identification and/or the called party's telephone number. The call processing system 101 uses the resident's identifier to notify the called party of the caller's identity. Similarly, the call processing system 101 may also use the called party's telephone number to determine if the called party has a person-to-person account in place. This determination is made by the person-to-person engine 108 accessing the person-to-person database 112.

Call processing system 101 may use an interactive communication engine 110, such as an interactive voice response (IVR) engine, Voice Response Unit (VRU) engine or similar system, to communicate with the resident and/or called party. IVR engine 110 may play system messages and then recognize and respond to responses from the resident and/or called party. For example, upon detection that a new call has been initiated, communication engine 110 may select a welcome or introduction message from a system message database. IVR engine 110 may also be used to support automatic interaction between call processing system 101 and an answering or called party. IVR engine 110 may prompt the person who answers the destination telephone—the answering party—to verify that they are also the called party. This prompt may request that the answering party provide a PIN, code word, or other information. The answering party's response is provided to person-to-person verification engine 108, which verifies whether the answering party has provided the correct response. The answering party's response may be compared to information stored in person-to-person database 112, such as a PIN, code word, or biometric voice sample, for the called party.

Call processing system 101 may use call monitoring engine 109 to record some or all calls. Call recordings and call-related data may be stored to recorded call database 115. Call monitoring engine 109 monitors calls for improper content, such as criminal activity or threats. Once improper content is detected, call monitoring engine 109 notifies call processing system 101, which may disconnect the call, and/or alert a monitoring agent or authority.

Although an exemplary embodiment described herein is deployed in a controlled environment facility to provide calling services to residents, those of ordinary skill in the art will understand that the systems and methods described and claimed herein may be used in other facilities and locations to provide communications services to other groups or individuals.

FIG. 2 is a flowchart illustrating set up of a person-to-person account according to one embodiment. At step 201, the user creates a person-to-person calling account. The person-to-person account may be established by the resident or detainee, or by a potential called party. The person-to-person account may be created via a computer application, IVR or on an internet web site. Alternatively, the person-to-person account may be set up by filling out a form or requesting an account through the controlled environment facility.

In one embodiment, the person-to-person account is used to limit who a correctional facility prisoner may talk to at selected destination telephone numbers. The prisoner or friends and family of the prisoner may set up the person-to-person account. The person-to-person account is used by the prisoner or friends and family to control who can receive calls from the prisoner. For example, to save money, the parties may want to ensure that calls from the prisoner are connected only to a specific group of people at the destination telephone number, such as the prisoner's parents. Other people, such as relatives or visitors at the parent's home, who do not have the person-to-person account code would not be able to receive calls from the prisoner. This would save telephone call costs by limiting calls from the prisoner to the parents only.

Typically, a prison telephone system may allow inmates to make calls to a list of permissible telephone numbers. The inmates are usually allowed to make telephone calls to family, friends and other persons using a prisoner telephone system at the discretion of correctional facility staff. Certain telephone numbers are restricted from receiving prisoner calls for legal, operational and security reasons. Usually, prisoners are required to provide a list of the telephone numbers that they desire to use while incarcerated. If approved by the prison staff, these telephone numbers are added to the inmate's Pre-Approved Number (PAN) list. This list will contain numbers for family, friends, and attorneys, for example. However, the people on the friends and family list or others may not want to receive calls from the prisoner or may want to control calls received from the prisoner.

These people may set up a person-to-person account to control how incoming prisoner calls are processed. For example, a person may want to receive calls from a prisoner, but may also want to prevent incoming calls from being answered by family members, such as children. Third parties, who are not necessarily friends and family, may also set up a person-to-person account in anticipation of receiving calls from the prisoner. Ultimately the called party has the ability to control the method by which the call is delivered. For example, victims, witnesses, former associates, or others may want to limit or control incoming prisoner calls in addition to any projection provided by the PAN list.

When the user creates an account, he or she provides relevant personal information in step 202. Personal information may include, for example, the user's name, telephone numbers, e-mail address, and identity verification measure. This information is then stored in a person-to-person database. The person-to-person account data may be specific for a particular facility or may be accessible by one or more custodial facilities. In this way, the person-to-person account data may be used by multiple facilities if the prisoner is moved or transferred. The user may be able to associate one or more telephone numbers with the person-to-person account, such as home, work, and mobile telephone numbers. The list of destination numbers may also include information that identifies an Internet address, email address, or IP address associated with a Voice over IP (VoIP) or videoconferencing system. In some embodiments, the user may also indicate preferences, such as times during which the person-to-person screening should be applied or when no calls will be accepted.

In step 203, the user agrees to terms and conditions of establishing the person-to-person account. In some embodiments, the terms and conditions may require the user to agree to pay an additional surcharge for each person-to-person call received. Alternatively, the user may be required to agree to pay a monthly surcharge to maintain the person-to-person account. Once the user reviews the terms and conditions, the user may electronically sign to acknowledge acceptance if the person-to-person account is established using a computer application, website or IVR.

The person-to-person account is activated in step 204. After establishing the person-to-person account, the user may make changes to account information or to deactivate the account. For example, the user may log into the account to change identity verification data or payment type at anytime.

In other embodiments, the user can set up a person-to-person account through the custodial facility. The user would provide the same information to the custodial facility to be uploaded to the person-to-person database. When the user sets up the account with the custodial facility, the user may be presented with a physical copy of the terms and conditions, which the user may be required to sign.

FIG. 3 is a flowchart use of a person-to-person calling system according to one embodiment. At step 301, the call processing system detects the initiation of a call, such as when a resident lifts a receiver on a resident telephone. At step 302, the call processing system identifies the caller. However, in other embodiments, caller identification may not be required. A resident may input an identification number and identification verifier, such as a PIN, radio frequency identification (RFID), biometric identifier, or other similar means of verifying the inmate's identity. The caller's identification may be used to identify the resident to the called party or determine whether the caller is authorized to use the system. Using the inmate's identification number and identification verifier, the system checks the inmate's privileges, such as in resident database 113 (FIG. 1).

In step 303, the call processing system collects the telephone number of the called party or the Billed to Number (BTN). Then, in step 304, the call processing system prompts the resident, using the interactive communication engine, to indicate how the call should be charged. The call may be charged to a trust account or a prepaid account associated with resident or to the called party for a collect call. In step 305, the call processing system verifies billing information, and then obtains person-to-person account data for the called number in step 306.

In step 307, the call processing system initiates a call to the called number, and in step 308 requests that the answering party confirms the identification information. The call processing system may use an IVR engine to interact with the answering party. The call processing system may or may not provide the resident or calling party's name to the answering party. The person who configures the person-to-person account may configure the amount of information that is provided by the call processing system during an initial communication. The answering party may be notified that an incoming call has been requested from/to specific persons, from/to particular locations, from/to particular telephone numbers, and/or other information. This would allow varying levels of privacy. The called party may not want others to know that he is receiving calls from a prisoner, for example, and may set up the account to only identify the originating telephone number or the called party name.

In step 309, the call processing system processes the identity verification information provided by the answering party. The identity information may be compared to data that is stored in a person-to-person account database. If the identity verification is inaccurate, the process either returns to step 308 to request the identification information again or proceeds to step 310 and terminates the call. If the identity verification is accurate, then the call connection is completed between the resident and the called party in step 311. After the call connection is completed, the call may be monitored and recorded.

The verification may include a comparison of a PIN entered by the answering party to a PIN stored in the person-to-person account data. The PIN may be entered using a telephone keypad. Alternatively, the identification information may be a code word spoken by the answering party that is compared to a code word stored in the person-to-person account data. The code word or other spoken words from the answering party may be compared to reference biometric voice data stored in the person-to-person account data for verification of the called party.

In one embodiment, when voice biometric data is used, the call processing system may begin monitoring the answering party immediately upon connection and may allow the call to be connected as soon the answering party has been verified as the called party. Verification using voice biometric data may be complete when the answering party's voice and a reference biometric voice data sample are matched to a selected accuracy.

If the resident or calling party has indicated in step 304 that the call is going to be a collect call, then the answering party may be notified that the call is a collect call and may accept or reject the collect call as part of the verification process in steps 308 and 309.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A call processing system, comprising:
   a memory; and
   a processor coupled to the memory, the processor configured to execute program instructions stored in the memory to cause the call processing system to implement:
   a person-to-person engine configured to identify a person-to-person account corresponding to a destination telephone, wherein the call processing system is configured to complete a call connection between an originating telephone and the destination telephone if the person-to-person engine determines that an answering party at the destination telephone provides identification information matching information stored in the person-to-person account; and
   an interactive communication engine configured to present a message to the answering party, the message configured to prompt the answering party to provide the identification information, and the message configured to exclude other information designated by the answering party.

2. The call processing system of claim 1, wherein the message is configured to exclude an indication that the call connection originates from a jail or prison in response to the answering party having configured the person-to-person account to exclude the indication.

3. The call processing system of claim 1, wherein the message is configured to exclude an indication of an identity of a prisoner or inmate operating the originating telephone in response to the answering party having configured the person-to-person account to exclude the indication.

4. The call processing system of claim 1, wherein the message is configured to exclude an indication of a location of the originating telephone in response to the answering party having configured the person-to-person account to exclude the indication.

5. The call processing system of claim 1, wherein the identity verification is selected from the group consisting of: PIN, code word, voice-biometric data, and facial recognition.

6. The call processing system of claim 1, the processor further configured to execute program instructions stored in the memory to cause the call processing system to implement:
   a billing engine adapted to identify a billing account for the calling party, wherein the call processing system is configured to complete a call connection between the originating telephone and the destination telephone if the billing engine identifies a valid billing account.

7. The call processing system of claim 1, the processor further configured to execute program instructions stored in the memory to cause the call processing system to implement:
   a call monitoring engine adapted to monitor the call connection.

8. The call processing system of claim 7, wherein the call monitoring engine is configured to alert a monitor upon detection of an infraction by the calling or called party.

9. A method, comprising:
   detecting when a request for a call connection to a called party is initiated by a calling party;
   determining, using a person-to-person engine, whether a person-to-person account exists for the called party;
   requesting, using an interactive communication engine, the called party to provide identity verification, wherein the request presents a message to the called party that excludes information selected by the called party as configured in the person-to-person account, the information including at least one of: an indication that the call connection originates from a jail or prison, or an indication that the calling party is a prisoner or inmate;
   verifying, using the person-to-person engine, the identity of the called party; and
   completing the call connection after the identity of the called party is verified.

10. The method of claim 9, further comprising:
    collecting identification information from the calling party.

11. The method of claim 9, further comprising:
    providing the called party with identification information from the calling party.

12. The method of claim 9, further comprising:
    recording the call connection between the calling party and the called party into a recorded call database.

13. A method for controlling a call connection between a calling party and a called party, comprising:
    detecting, at a call processing system, a call initiation by the calling party;
    identifying the calling party;
    identifying a called number;
    identifying a person-to-person account associated with the called number;
    initiating the call connection to the called number;
    requesting identity information from an answering party, wherein the request presents a message to the called party that excludes information selected by the called party as configured in the person-to-person account, the information including at least one of: an indication that the call connection originates from a jail or prison, or an indication that the calling party is a prisoner or inmate;
    comparing identification information provided by the answering party to identification information in the person-to-person account; and
    completing the call connection after verifying a match between the identification information provided by the answering party to identification information in the person-to-person account.

14. The method of claim 13, further comprising:
    determining billing information for the call connection;
    verifying the billing information; and
    charging an account identified by either the calling or called party.

15. The method of claim 13, wherein the identity information is a personal identification number (PIN), and wherein a person-to-person engine compares a PIN entered by the answering party to a PIN stored in the person-to-person account.

16. The method of claim 13, wherein the identity information is a code word, and wherein a person-to-person engine compares a code word entered by the answering party to a code word stored in the person-to-person account.

17. The method of claim 13, wherein the identity information is voice biometric data, and wherein a person-to-person engine compares speech spoken by the answering party to voice biometric data stored in the person-to-person account.

18. The method of claim 13, wherein the identity information is facial recognition, and wherein a person-to-person engine compares facial recognition by the answering party to facial data stored in the person-to-person account.

* * * * *